United States Patent
Kramer et al.

(10) Patent No.: US 7,624,443 B2
(45) Date of Patent: Nov. 24, 2009

(54) METHOD AND SYSTEM FOR A SELF-HEATING DEVICE

(75) Inventors: Michael Kramer, Yonkers, NY (US);
Scott A. Field, Redmond, WA (US);
Marc E. Seinfeld, Hong Kong (HK);
Carl Carter-Schwendler, Kirkland, WA (US); Paul Luber, Redmond, WA (US);
Adrian M. Marinescu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 11/018,412

(22) Filed: Dec. 21, 2004

(65) Prior Publication Data
US 2006/0137010 A1   Jun. 22, 2006

(51) Int. Cl.
*G06F 11/00* (2006.01)
*G06F 17/30* (2006.01)
*G06F 15/177* (2006.01)
*G06F 1/24* (2006.01)
*H04L 29/06* (2006.01)
*G06F 11/30* (2006.01)
*G06F 15/173* (2006.01)
*G06F 12/00* (2006.01)

(52) U.S. Cl. .................. 726/22; 726/3; 713/1; 713/100; 713/165; 713/187; 713/188; 709/224; 707/10; 707/204

(58) Field of Classification Search ............ 726/22
See application file for complete search history.

(56) References Cited

U.S. PATENT DOCUMENTS

| 6,101,500 | A * | 8/2000 | Lau .................. 707/103 R |
| 6,542,813 | B1 * | 4/2003 | Kovacs .................. 701/208 |
| 7,114,184 | B2 * | 9/2006 | Malivanchuk et al. ......... 726/24 |
| 7,403,942 | B1 * | 7/2008 | Bayliss .................... 707/5 |
| 2003/0233399 | A1 * | 12/2003 | Prohel et al. ............... 709/201 |
| 2004/0117572 | A1 * | 6/2004 | Welsh et al. ............... 711/162 |
| 2004/0158730 | A1 * | 8/2004 | Sarkar ...................... 713/200 |
| 2005/0076262 | A1 * | 4/2005 | Rowan et al. ................ 714/6 |
| 2006/0021032 | A1 | 1/2006 | Challener et al. |

OTHER PUBLICATIONS

Karger et al., A VMM Security Kernal for the VAX Architecture, Proceedings of the Computer Society Symposium on Research in Security and Privacy, IEEE, Pub. May 1990, pp. 2-19.
OA dated Nov. 16, 2007 for U.S. Appl. No. 11/019,094, 12 pages.

* cited by examiner

*Primary Examiner*—William R Korzuch
*Assistant Examiner*—Aravind K Moorthy
(74) *Attorney, Agent, or Firm*—Workman Nydegger

(57) ABSTRACT

A self-healing device is provided in which changes made between the time that an infection resulting from an attack on the device was detected and an earlier point in time to which the device is capable of being restored may be recovered based, at least in part, on what kinds of changes were made, whether the changes were bona fide or malware induced, whether the changes were made after the time that the infection likely occurred, and whether new software was installed.

16 Claims, 12 Drawing Sheets

METHOD AND SYSTEM FOR A SELF-HEATING DEVICE

CROSS-REFERENCE TO RELATED APPLICATION

This application is related to concurrently filed nonprovisional U.S. patent application Ser. No. 11/019,094, entitled "COMPUTER SECURITY MANAGEMENT, SUCH AS IN A VIRTUAL MACHINE OR HARDENED OPERATING SYSTEM," which is assigned to the same assignee as this application.

TECHNICAL FIELD

The present invention relates to computing devices and more particularly to recovering and restoring computing devices affected by malware.

BACKGROUND

Current anti-virus technology is designed to quarantine or disinfect files and data damaged or destroyed by a malicious software attack, such as a virus or worm, generally referred to herein as malware. However, reversing the damage requires knowledge about the malware that was used in the attack, such as the type of damage caused by a specific virus and instructions to reverse the damage. Obtaining such knowledge is a labor-intensive process, as anti-virus researchers must reverse engineer the specific virus and develop the instructions to reverse the damage, i.e., a signature to identify and remove the malware must be developed. Consequently, there is often a delay in obtaining the signatures necessary to repair the files and data affected by the attack. Moreover, the resulting repair may not cover variants of the malware, which require obtaining updated signatures. This is especially problematic, since the devices under attack are frequently personal computers of consumers that have not installed anti-virus software, or who have allowed their anti-virus subscriptions to lapse and, therefore, do not have updated signatures.

Malware sometimes opens a "back door" into the device under attack that can be exploited by other malware to further compromise the device. Because it is not always possible to know what other malware exploited the back door and installed itself, the device may be in an indeterminate state of infection, and the damage may not be easily repaired using signature-based removal.

Malware can also leave the device in a state in which the operating system files are no longer intact. This requires a recovery step to replace the damaged operating system files before attempting to repair the remaining damage.

In some cases, the damage caused by malware may be irreparable. For example, malware that propagates via file infectors can damage executables or user data in a non-reversible way, leaving the files infected or disabled. Malware can also maliciously delete files which existing anti-virus technology cannot restore.

These problems coupled with the speed with which malware can infect massive numbers of devices before being detected, as well as the prevalence of malware that can infiltrate process in such a way as to bypass existing anti-virus defenses, presents numerous challenges in defending against malware attacks.

SUMMARY

The foregoing problems with the prior state of the art are overcome by the principles of the present invention, which is directed toward methods, systems, computer program products, and data structures for recovering from a malware attack.

According to one aspect of the invention, a device is analyzed to determine whether any changes were made between a time that an infection resulting from an attack was detected and an earlier point in time to which the device may be capable of being restored. When no changes were made, the state of the device may be restored to the earlier point in time. When changes were made, the state of the device may be restored based at least in part on whether the changes were made after the time that the infection is estimated to have occurred. The state of the device may be further restored based on what kinds of changes were made, whether the changes were bona fide or malware induced, and whether new software was installed.

According to one other aspect of the invention, evidence that may indicate a presence of infection is uncovered from changes in the state of the device. The evidence may be uncovered from information parsed and/or aggregated from a change journal maintained for a file system used by the device. The evidence may also be uncovered from examining differences between archived and live data stored on the device, including differences between the device's disk states at different points in time. The evidence may include evidence that indicates the time that the infection actually or likely occurred. The evidence that indicates the time that the infection actually or likely occurred may be analyzed to determine an estimate of the actual time that the infection occurred.

According to one other aspect of the invention, an earlier point in time to which the device may be capable of being restored, referred to as a restore point, may be determined from the device's available disk state(s) saved at a corresponding earlier point in time. The available saved disk state may be evaluated for trustworthiness via a disk state interface. The disk state interface may operate in conjunction with one or more malware providers to evaluate the trustworthiness of a disk state for, among other uses, recovering from a malware attack. The evaluation of trustworthiness may include grading the disk state in accordance with a grading scheme, the grading scheme indicating the presence or absence of infection, or whether the presence or absence of infection is unknown.

According to yet another aspect of the invention, the device is processed to identify changes made since time that the infection is estimated to have occurred. The changes may include additions, modifications, and deletions of files and other data, and may include changes that are bona fide or malware induced. The files and other data include, but are not limited to, operating system files and/or other system data, including registry entries, as well as user files and/or other user data. Changes that are temporary may be excluded.

According to still another aspect of the invention, the device is further processed to determine whether new software was installed since a restore point. When no new software was installed, the device may be recovered, at least in part, by restoring the state of the operating system files and/or other system data, including registry entries, to the restore point.

According to still another aspect of the invention, the device may be recovered by selectively recovering changes that were made after the time that the infection is estimated to have occurred, including selectively recovering changes based on user confirmation. The device may be further recovered by selectively recovering changes from a saved disk state corresponding to a restore point based on the trustworthiness of the saved disk state.

According to one other aspect of the invention, the changes may be presented in a user interface to facilitate recovering the device, including prompting the device user to confirm which changes to recover and/or how to recover them, and further including presenting the device user with the trustworthiness of the saved disk state from which changes may be recovered.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following discussion is intended to provide a brief, general description of a computing system suitable for implementing various features of the invention. The computing system will be described in the general context of a personal computer usable in a distributed computing environment, in which complementary tasks may be performed by remote computing devices linked together through a communication network. However, those skilled in the art will appreciate that the invention may be practiced with many other computer system configurations. For example, the invention may be practiced with a personal computer operating in a standalone environment, or with multiprocessor systems, minicomputers, mainframe computers, and the like. In addition to the conventional computer systems described above, those skilled in the art will recognize that the invention may be practiced on other kinds of computing devices including laptop computers, tablet computers, personal digital assistants (PDAs), or any device upon which computer software or other digital content is installed.

For the sake of convenience, much of the description of the computing system suitable for implementing various features of the invention may include references to the Windows NT operating system and File System (NTFS) used to store and retrieve files residing on a storage volume. However, those skilled in the art will recognize that those references are only illustrative and do not serve to limit the general application of the invention. For example, the invention may be practiced in the context of other operating systems and file systems, such as the file allocation table (FAT) and the OS/2 High Performance File System (HPFS) used in other versions of the Windows operating system, or the LINUX operating system and associated file system.

Certain aspects of the invention may be described in terms of programs executed or accessed by an operating system in conjunction with a personal computer. However, those skilled in the art will recognize that those aspects also may be implemented in combination with various other types of program modules or data structures. Generally, program modules and data structures include routines, subroutines, programs, subprograms, methods, interfaces, processes, procedures, functions, components, schema, etc., that perform particular tasks or implement particular abstract data types.

Figure 1:
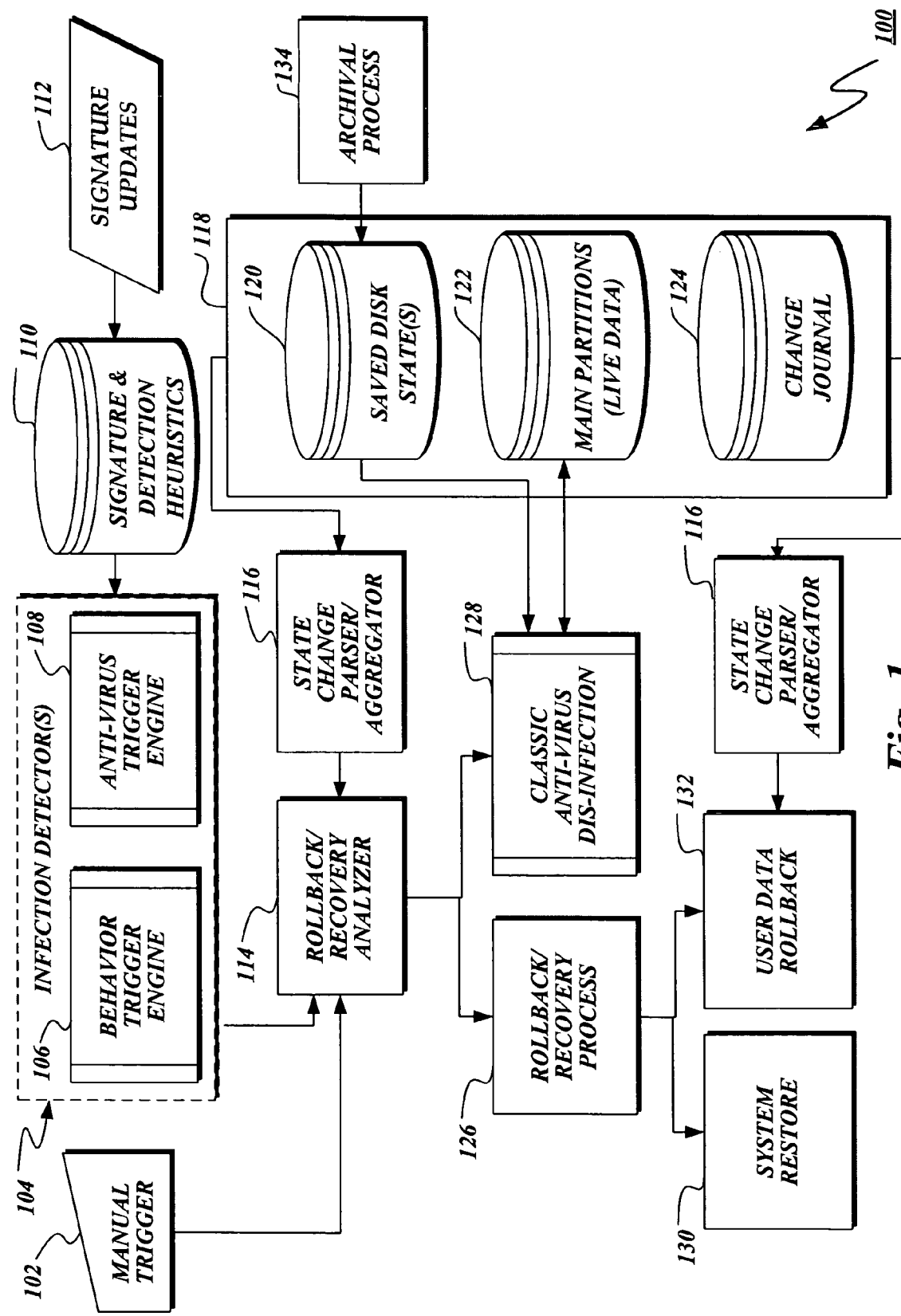
FIG. 1 depicts an overview of an exemplary system for recovering from a malware attack, formed in accordance with the present invention.

FIG. 1 depicts an overview of an exemplary system 100 for recovering from a malware attack, formed in accordance with the present invention. As illustrated, the system 100 includes, among other components, a recovery analyzer 114 and recovery process 126 that together embody procedures to restore a device and recover data from saved disk state(s) 120 of one or more volumes of data that were archived at an earlier point in time using an archival process 134. In operation, the recovery analyzer 114 analyzes a device to uncover evidence that the device may have been attacked by malware. In one embodiment, the recovery analyzer 114 further determines an estimate of an actual time of infection, as well as the availability of saved disk state(s) 120 archived at points in time prior to the estimated time of infection. The recovery process 126 uses the saved disk state(s) 120 to restore the device and/or recover data that may have been damaged in the attack, i.e., to heal the device.

The evidence of the attack, as well as the estimate of the time of infection, may be based on information gleaned from one or more sources 118 on the device, including but not limited to, the saved disk state(s) 120, live data 122, and a change journal 124 generated by a file system operating on the device. In one embodiment, the information is parsed and aggregated by a state change parser/aggregator module 116 that uncovers evidence that may indicate a presence of infection from state changes and other system audit information.

For example, in one embodiment, the state change journal 124 may be implemented as Windows NT file system ("NTFS") change journal. As files, directories, and other NTFS objects are added, deleted, and modified, NTFS enters change journal records in streams, one for each volume on the device. Each record indicates the type of change and the object changed. The offset from the beginning of the stream for a particular record is called the update sequence number (USN) for the particular record. New records are appended to the end of the stream, after which the file system updates a master file table ("MFT") entry with the last USN value for the changed file or directory.

In one embodiment, the saved disk state(s) 120 from which the device may be restored and data recovered may be point-in-time copies of a volume of data automatically provided by an archival process 134 such as the Windows Volume Shadow Copy Services ("VSS"), also referred to as shadow copies. However, it is understood that other means for saving disk states in a device may be employed without departing from the scope of the claims that follow, as long as the disk states are sufficiently trustworthy for the purpose of restoring a device and/or recovering data. For example, in one embodiment the saved disk state(s) 120 may be generated by an archival process that generates snapshots of data on the device automatically or on demand, or obtained from disk states preserved in a volume for which a mirrored plex is retained, or from data that has been replicated using a separate storage device or subsystem.

In one embodiment, the state change parser/aggregator module 116 parses the information in the change journal 124 or examines the saved disk state(s) 120 to uncover evidence that may indicate the actual time of an infection. In this manner, the state change parser/aggregator module 116 may provide the recovery analyzer 116 with sufficient information to enable the analyzer to at least determine an estimate of the actual time of infection, i.e., to determine the likely time of infection. It should be understood that other sources of system audit information besides the change journal 124 and the saved disk state(s) 120 could be used in a similar manner to uncover evidence and determine the likely time of infection. For example, process audit logs that pinpoint process creation times and other logged events from the device's management console output logs may also be used, as long as the evidence that is uncovered is sufficient to determine the likely time of infection with a substantial degree of specificity. In some instances, the evidence may even be sufficient to determine the actual time of infection. Accordingly, in the description that follows, references to determining the likely time of infection may be understood to include determining the actual time of infection should sufficient evidence be uncovered.

In one embodiment, once the likely time of infection has been determined, the recovery process 126 may be initiated to begin the recovery from the malware attack in accordance with the present invention. Alternatively, the analyzer 114 may instead initiate a classic anti-virus disinfection process 128 in those situations where the triggering event warrants conventional disinfection of the device, e.g., where the anti-virus signature indicates that the malware is relatively simple and disinfection is well-defined.

In a typical embodiment, the recovery process 126 may be split into two processes, a system restore process 130 that performs a system rollback to recover system files, and a user data rollback to recover user files. The recovery process 126 may initiate one or both processes 130 and 132 to restore the system and/or selectively recover data on the device using saved disk state(s) 120 made prior to the likely time of infection.

In one embodiment the recovery process 126 is performed in conjunction with a user interface as will be described in further detail in FIGS. 4-9. The user interface facilitates confirmation of the recovery procedures by the device's user.

The operation of the recovery procedures embodied in the recovery analyzer 114 and recovery process 126 may be triggered by one or more infection detectors 104. In one embodiment, the infection detectors 104 comprise at least one of a behavior trigger engine 106 and an anti-virus trigger engine 108. The infection detectors 104 may be adapted to use minimal signature and/or other detection heuristics 110 and signature updates 112 to detect an event that triggers the operation of the recovery procedures. The event typically signals possible or actual damage to the device of the type that correlates to damage caused by a known virus or other type of malware, e.g., an event that matches a signature. However, the event may also include the discovery of other types of suspect behavior or information on the device that is not signature-based, but that indicates the presence of malware. For example, to reduce reliance on anti-virus signature definition, the minimal signature and/or other detection heuristics 110 may include, among others, the occurrence of unusual disk or network activity, or the presence of suspicious data. Alternatively, or in addition, the operation of the recovery analyzer 114 and recovery process 126 may be triggered manually through a manual trigger 102.

Figure 2:
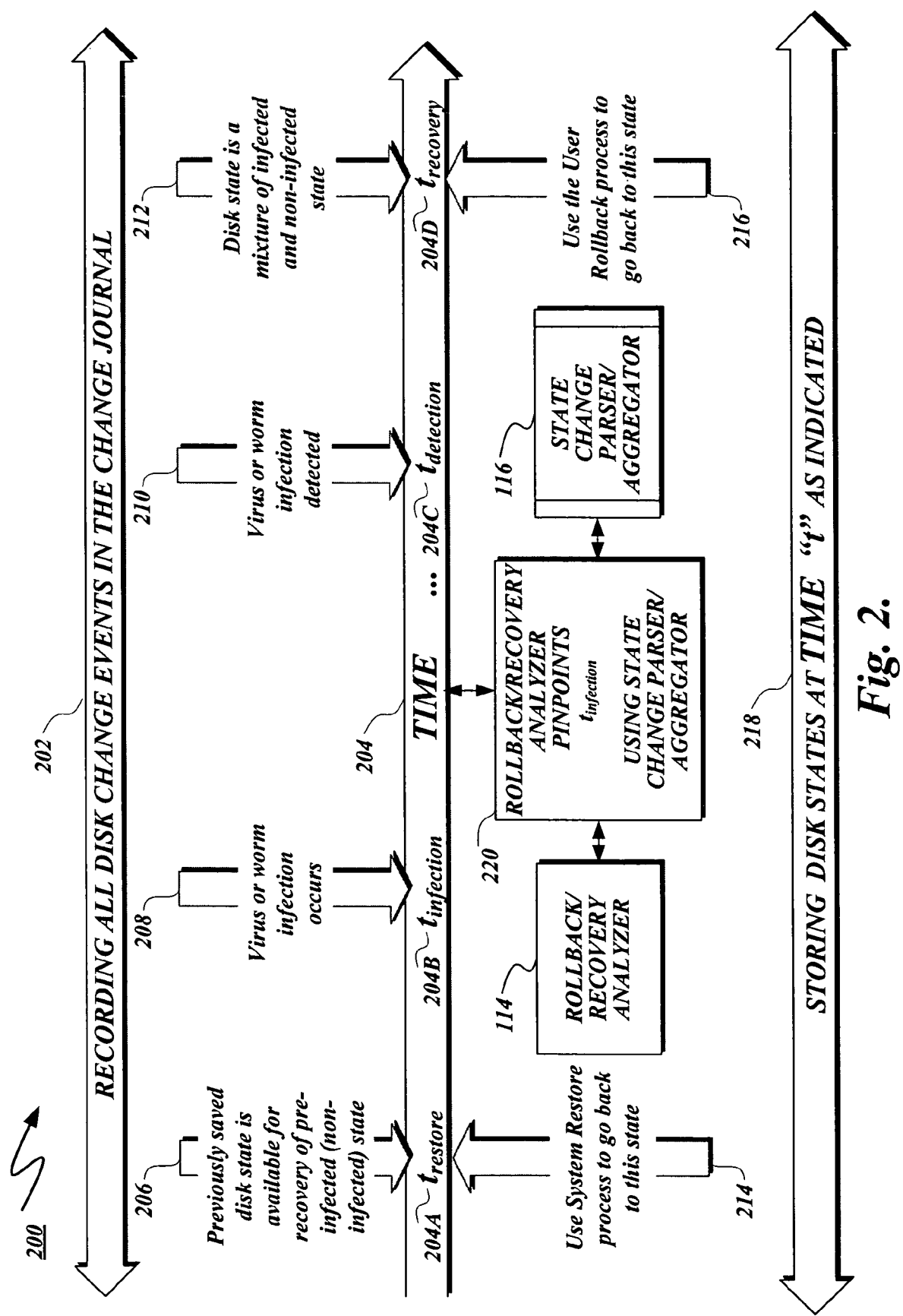
FIG. 2 depicts a timeline illustrating a typical scenario in which a system for recovering from a malware attack may be employed in accordance with the present invention.

FIG. 2 depicts a timeline illustrating a typical scenario 200 in which the above-described system 100 for recovering from a malware attack may be employed in accordance with the present invention. As illustrated, a time arrow 204 represents the passage of time, and a parallel recording arrow 202 represents the automatic recording of all disk change events in a change journal during the represented passage of time. Similarly, a parallel storing arrow 218 represents disk states at times "t," occurring and possibly saved during the represented passage of time. In the illustration, four times are highlighted, $t_{restore}$, 204A, $t_{infection}$, 204B, $t_{detection}$, 204C, and $t_{recovery}$, 204D. Time $t_{restore}$, 204A, represents the time for which a saved disk state is available for recovery of the device's pre-infected state, as described at reference numeral 206. Time $t_{infection}$, 204B, represents the time that the device was actually infected by a virus, worm, or other type of malware, as described at reference numeral 208. Time $t_{detection}$, 204C, represents the time that an infection by a virus, worm, or other type of malware was detected, as described at reference numeral 210. Lastly, time $t_{recovery}$, 204D, represents the time that a recovery was initiated, i.e., when the device's disk states are a mixture of infected and non-infected states, as described at reference numeral 212.

Continuing with reference to FIG. 2, at process block 220, the system's analyzer 114 analyzes the device to determine an estimate of the actual time of infection, $t_{infection}$, 204B, i.e., the likely time of infection, typically by using the services of a state change parser/aggregator 116, as described previously with reference to FIG. 1. In some cases, the system's analyzer 114 may be able to determine the actual time of infection, $t_{infection}$, 204B, and not just an estimate. In the illustrated scenario, the likely time of infection, or, the actual time of infection, $t_{infection}$, 204B, as the case may be, together with the pre-infection disk states, e.g. the available disk states saved at time $t_{restore}$ 204A, are input to the recovery process 126 to determine whether the device's operating system and user data may be recovered. In some cases, a system restore process 130 is used to restore the device to the state it was in prior to the likely or actual time of infection $t_{infection}$, 204B, using the previously saved disk states, as indicated at reference numeral 214. Alternatively, or in addition, a user rollback process 132 is used to selectively roll back the affected files or other data on the device to the state they were in prior to the likely or actual time of infection $t_{infection}$, 204B, using the previously saved disk states, as indicated at reference numeral 216.

In a typical scenario, there may be several saved disk states $t_{restore}$ 204A from which the device's operating system and user data may be recovered using the system restore process 130 and/or user rollback process 132. However, not all of the available saved disk states $t_{restore}$ 204A may be trustworthy. For example, in some devices, the operating system will save disk states by taking shadow copies on a regular basis in anticipation that the shadow copies will be relied upon from time to time by one or more system components and/or other third party applications. The shadow copies typically persist across the lifecycle of a virus/malware infection and subsequent disinfection. Given their read-only nature, the shadow copies may themselves be infected, and not "cleanable."

Since an infected disk state may be persisted in a shadow copy over a long period of time, it may be prudent for applications that rely on shadow copies, such as the system restore 130 and user rollback processes 132, to obtain verification of a shadow copy's trustworthiness. The level of trustworthiness may vary depending on the type of use. For example, when performing a system restore, the shadow copy may or may not be held to a higher standard of trustworthiness than when performing a single file (e.g., user data) restore. Accordingly, in one embodiment the system restore 130 and user rollback processes 132 may obtain verification of the trustworthiness one or more saved disk states $t_{restore}$ 204A from which the device's operating system and user data may be recovered as will be described in further detail below with reference to FIG. 4.

Figure 3:
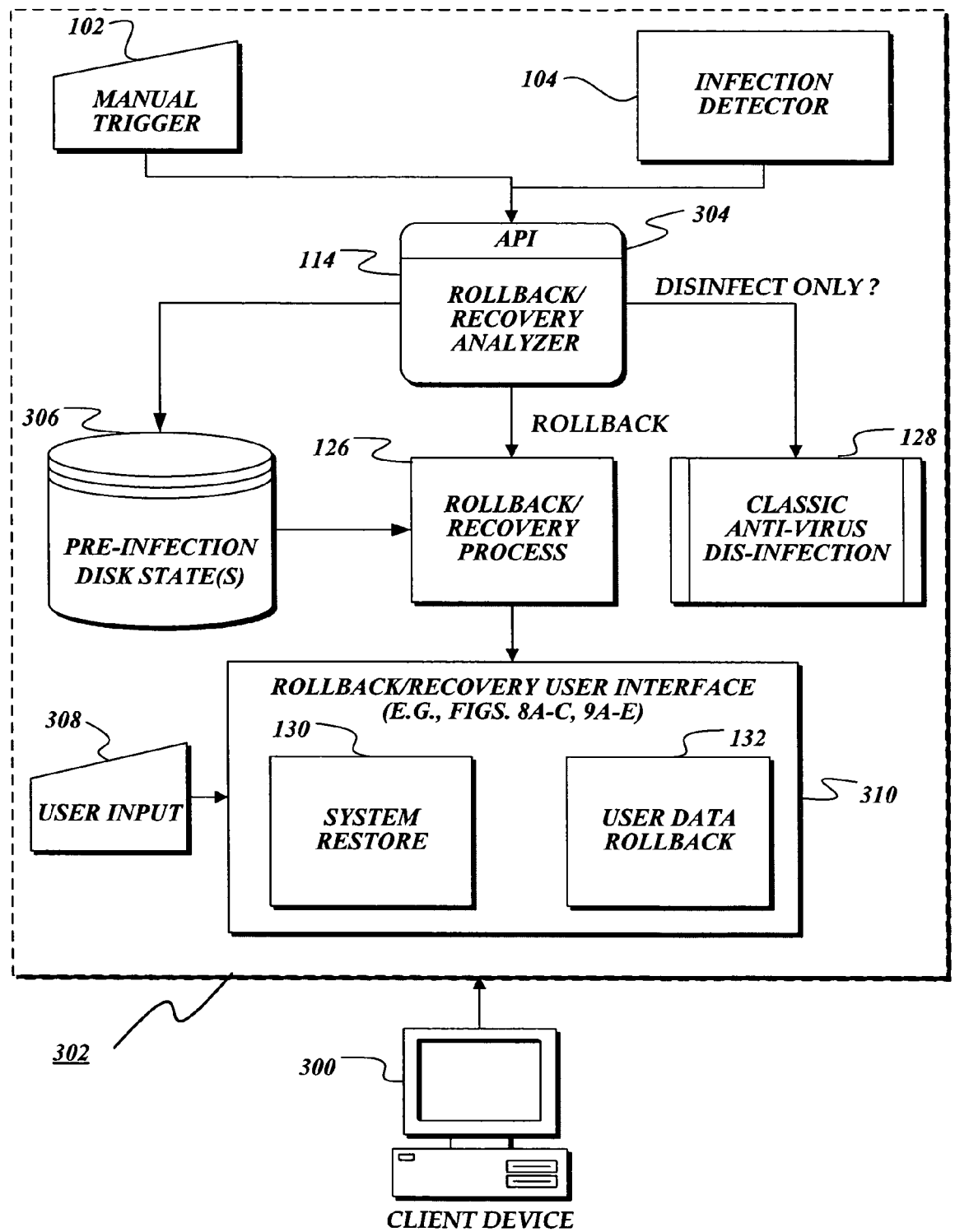
FIG. 3 depicts further aspects of the exemplary system illustrated in FIG. 1, formed in accordance with the present invention.

FIG. 3 depicts further aspects of the exemplary system 100 illustrated in FIG. 1, formed in accordance with the present invention. As shown, a client device 300 may be transformed into a self-healing computer when configured with a rollback and recovery system 302 comprising some or all of the components of exemplary system 100. In one embodiment, the rollback recovery analyzer 114 includes an application programming interface 304 that may be invoked by the infection detector 104 or by a manual trigger 102 to determine whether the client device 300 may heal itself using the recovery process 126. In some cases, the event that precipitated the invocation of the analyzer, e.g., the detection of a malware attack, may be such that the best way for the client device 300 to recover from the attack is to use a classic disinfection process 128. This may be the case, for example, when the attack is relatively simple or caused by a well-known virus, the effects of which are well defined and reversible. In such cases, the signatures used to document the malware attack may be encoded to ensure that classic anti-virus disinfection procedures are always used.

In a typical embodiment, an alternate and potentially more effective way for the client device 300 to recover from the attack (and often before the attack can be propagated to other devices connected to the device 300) may be to use the rollback and recovery process 126 instead of attempting a classic disinfection. Using the likely time of infection, as determined by the analyzer 114, (or the actual time of infection $t_{infection}$, 204B, as the case may be) the rollback recovery process 126 uses pre-infection saved disk state(s) 306 of files and data that may have been affected by the malware attack to provide a user with options for recovering their device. The options may be presented to the user as part of a system restore process 130 and a user data rollback process 132, each of which may use a rollback and recovery user interface 310 to receive a user input 308 that enables the selection and confirmation of the options. Examples of the user interfaces will be described and shown in further detail with reference to FIGS. 8A-C and FIGS. 9A-E. In one embodiment, the options that may be presented to the user as part of a system restore process 130 and a user data rollback process 132, may depend on the trustworthiness of the pre-infection saved disk state(s) 306 of files and data that may have been affected by the malware attack. In a typical embodiment, the trustworthiness of the pre-infection saved disk state(s) 306 may be determined as described in detail with reference to FIG. 4.

Figure 4:
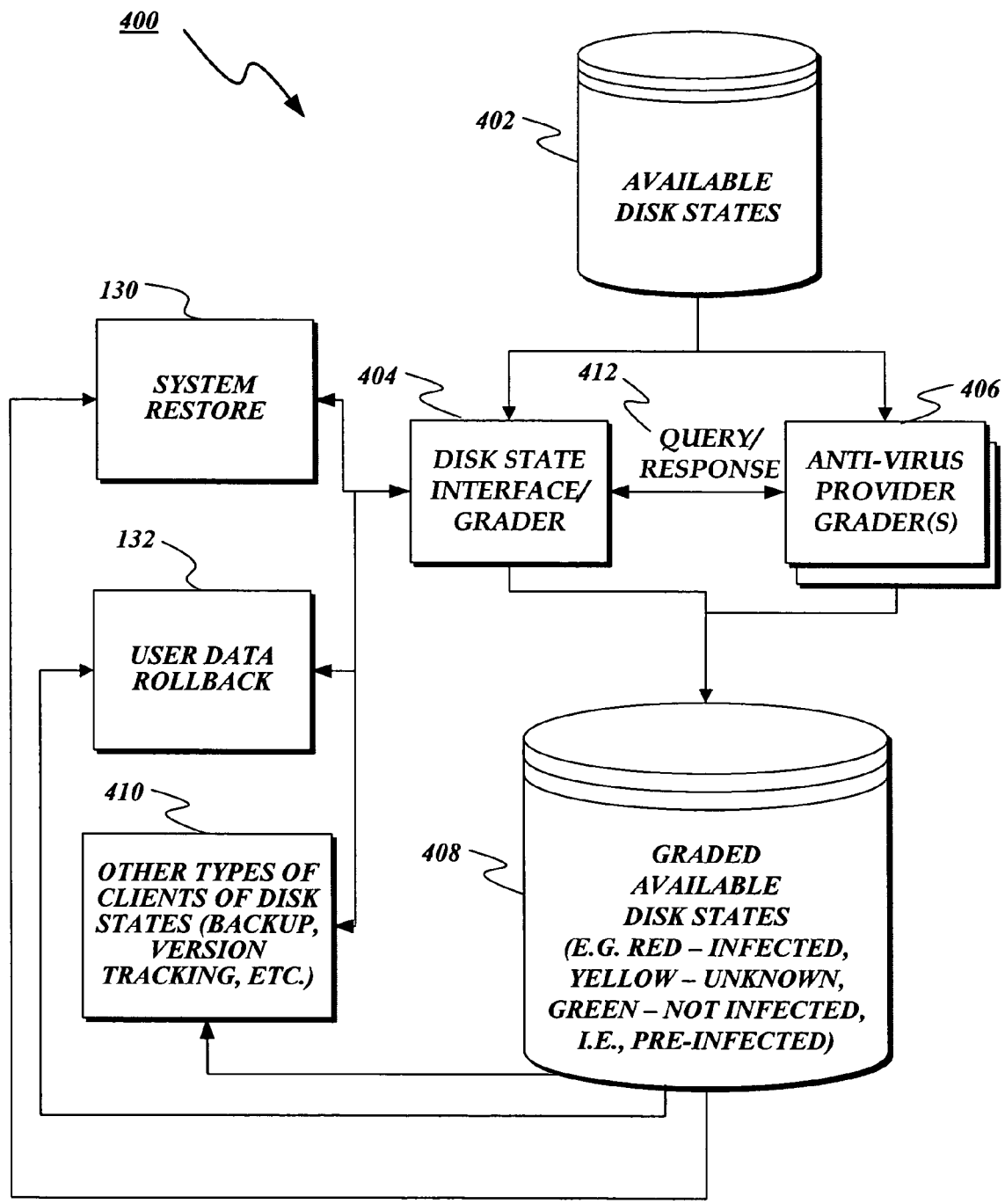
FIG. 4 depicts further aspects of the exemplary system illustrated in FIG. 1, formed in accordance with the present invention.

FIG. 4 depicts further aspects of the exemplary system illustrated in FIG. 1, formed in accordance with the present invention. As shown, either or both the system restore process 130 and the user data rollback process 132, may use a disk state grading subsystem 400 comprising, among other components, a disk state interface 404 to determine whether any of the available saved disk state(s) 402 comprising the pre-infection saved disk state(s) 306 can be verified as trustworthy. In general, a trustworthy disk state is one that is free of infection, and an untrustworthy disk state is one that is infected, or one in which the presence or absence of infection is unknown, or cannot otherwise be determined. In a typical embodiment, the system restore process 130 and/or the user data rollback process 132 query the status of a disk state, e.g., a particular saved disk state $t_{restore}$ 204A, also referred to herein as a shadow copy. A disk state interface 404 coordinates passing the query 412 to one or more anti-virus providers 406 that can analyze a disk state, such as the disk state $t_{restore}$ 204A, to determine the trustworthiness relative to a particular virus, worm, or other malware that the anti-virus provider is designed to detect. In this manner, the disk state interface 404 generates information about whether the restore point corresponding to the saved disk state $t_{restore}$ 204A is preferred or non-preferred. For example, non-preferred restore points may be infected by other malware attacks that occurred before the present attack, or may be contaminated with unwanted software, such as spyware or adware.

In one embodiment, the query 412 includes an indication of the intended use of the saved disk state, should it be determined to be trustworthy. The intended use may include such uses as restoring a system from the disk state, restoring a single file, backing up a system, backing up a single file, and the like. In some cases, the intended use may affect the determination of whether the saved disk state is trustworthy. For example, as noted previously, when the intended use is to restore a system, the required level of trustworthiness may be more stringent than when the intended use is to restore a single user file.

As a default action, should anti-virus providers 406 be unavailable or unable to determine the trustworthiness, the disk state interface 404 may attempt to determine the general trustworthiness of the disk state on its own. Once the trustworthiness has been determined, the disk state interface aggregates the results of the query 412, if applicable, and returns the result to the requester, e.g., the system restore process 130 or the user data rollback process 132. The requester can then determine whether to proceed with the intended use of the saved disk state.

Continuing with reference to FIG. 4, in one embodiment the trustworthiness of a disk state is graded in accordance with a grading scheme. For example, as illustrated in FIG. 4, the determination of the trustworthiness of one or more of the available disk states 402 may result in a corresponding graded disk state 408. The system restore 130 or user data rollback process 132 may use the graded disk state 408 to present the options to the user for restoring their device or recovering their files in the user interface 310 previously described with reference to FIG. 3.

In one embodiment, the grading scheme used to grade the saved disk state may comprise a color scheme. For example, a color scheme uses a particular color to visually represent a particular level of trustworthiness, e.g., RED represents an infected disk state, YELLOW represents an unknown disk state, and GREEN represents a disk state that is not infected, i.e., a "pre-infected" disk state. Of course, it is understood that a color scheme is just one example of a grading scheme, and that other grading schemes may be employed in the present invention without departing from the scope of the claims that follow. For example, certain icons or numbers may be used to represent the levels of trustworthiness instead of colors.

In one embodiment, the system restore 130 or user data rollback 132 processes may present the grading scheme representing the levels of trustworthiness of the saved disk state to a user in the user interface 310. The colors are used to guide the user in making a decision whether to proceed with restoring their system or recovering their files from the saved disk state. For example, a user may decide to forego a particular system restore option when the available disk state(s) from which the restoration would be performed is depicted in the user interface 310 as infected, unknown, or otherwise less than trustworthy. On the other hand, the user may decide to chance a particular user data recovery option when the available disk state from which the recovery would be performed is depicted in the user interface 310 as unknown.

It should be noted that other types of components of a device 300 may invoke the disk state interface 404 for purposes other than to restore the system or to recover user data. For example, there may be other types of disk state clients 410, such as applications to view previous versions or backups of system or user data, or applications to create backup data that may be interested in the trustworthiness of the disk states with which they are interacting.

Figure 5:
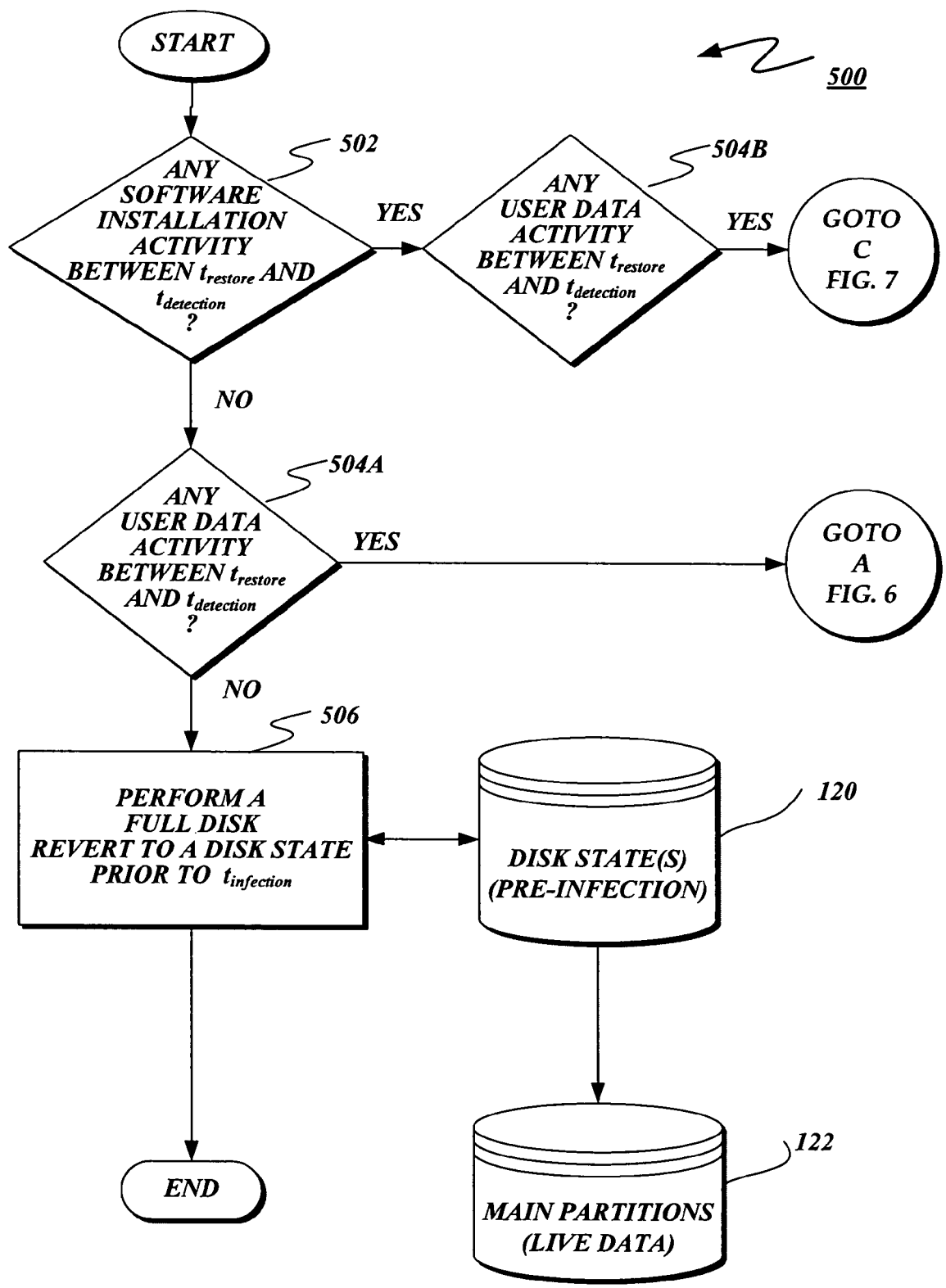
FIG. 5 is a flow diagram illustrating certain aspects of the logic performed by a general-purpose computer system for recovering from a malware attack, formed in accordance with the present invention.

FIG. 5 is a flow diagram illustrating certain aspects of the logic 500 performed by a method for recovering from a malware attack formed in accordance with the present invention. At decision block 502, a recovery analyzer 114 determines whether there has been any software installation activity on the device between the time that the malware attack was detected, $t_{detection}$, and the time to which the device is capable of being restored, $t_{restore}$. In most cases, $t_{restore}$ is the time prior to the likely time of infection, $t_{infection}$, for which a saved disk state may be available. In a typical embodiment, the determination of whether there has been any software installation activity may be made by inspection of the software add and remove history.

In a typical embodiment, when there has been no software installation activity, then processing continues at decision block 504A, in which the recovery analyzer 114 determines whether there has been any user data activity within the same timeframe. In those cases where there has been user data activity but no software installation activity, then a method for recovering the device is performed as described in further detail with reference to FIG. 6. Otherwise, at decision block 504B, in those cases where there has been both software installation and user data activity, then a method for recovering the device is performed as described in further detail with reference to FIG. 7.

Continuing with reference to FIG. 5, in one embodiment, when there has been no software or user data activity, the user of the device may be given the option, described at process block 506, to perform a full disk revert. A full disk revert may be achieved by reconfiguring a volume on the device to a state that existed at a given point prior to the time of infection, $t_{infection}$, using, for example, the available pre-infection saved disk state(s) 120 to overwrite live data 122. Since a full disk revert may destroy user data that was created or modified after the time the device was infected, this option may not always be acceptable to the user.

Figure 6:
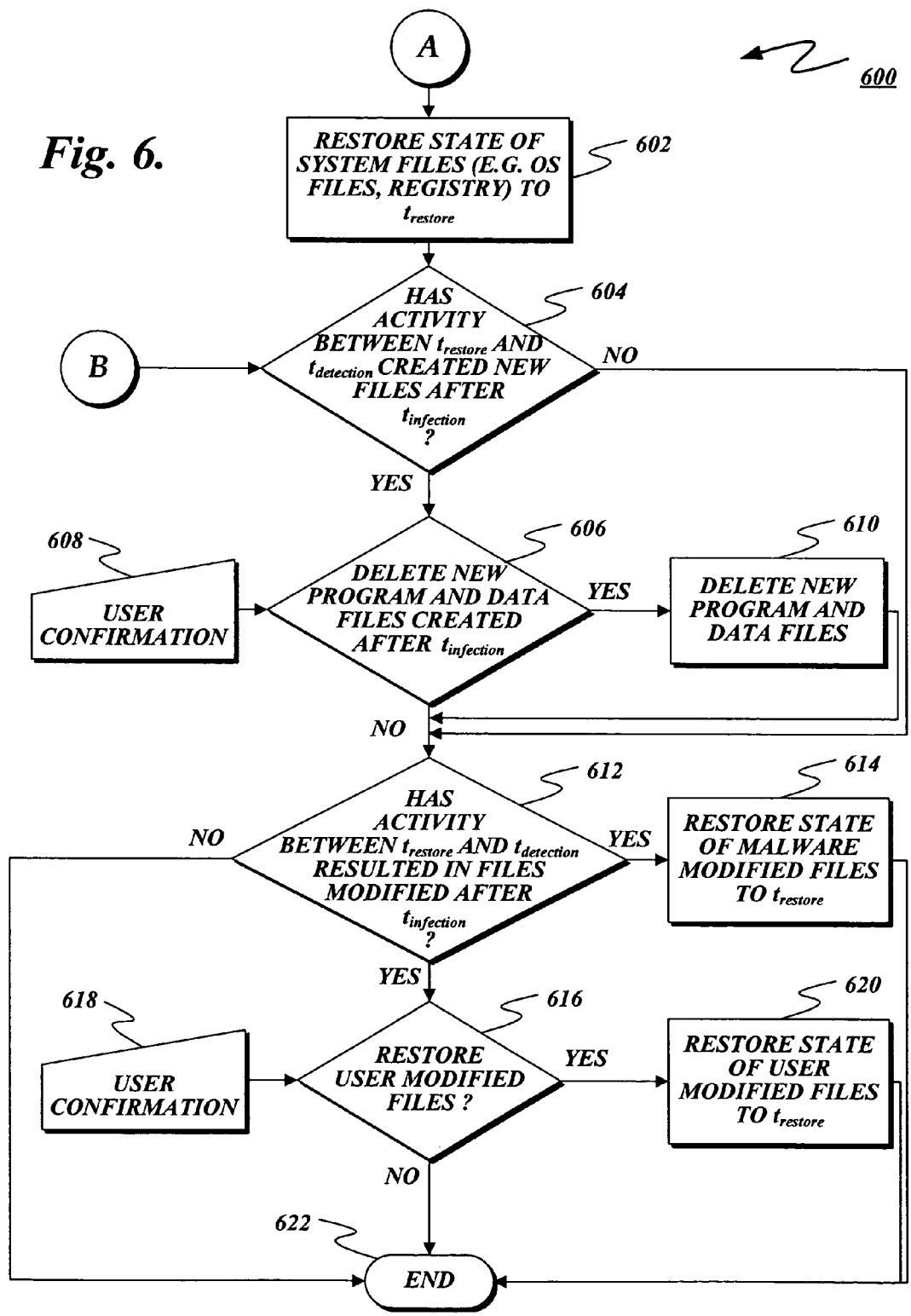
FIG. 6 is a flow diagram illustrating certain other aspects of the logic performed by a general-purpose computer system for recovering from a malware attack, formed in accordance with the present invention.

FIG. 6 is a flow diagram illustrating certain aspects of the logic 600 performed by a method for recovering from a malware attack formed in accordance with the present invention.

At process block 02, in those cases where there has been user data activity, but no software installation activity, the device may automatically restore the state of the system files prior to the infection. For example, the system restore process 130, first described with reference to FIG. 1, may be employed to automatically restore the state of the system files to $t_{restore}$. In a typical embodiment, $t_{restore}$ may be the most recent time prior to the likely time of infection, $t_{infection}$, for which a saved disk state of the affected system files and other data is available. The system files and other data that may be restored in this manner will typically include all operating system files as well as system registry entries.

At decision block 604, in those cases where the user data activity includes the creation of new files after the time of infection, $t_{infection}$, the user is given the option of deleting those new files. For example, at decision block 606, a user data rollback process 132, first described with reference to FIG. 1, may employ a user interface process 310. The user interface process 310, first described with reference to FIG. 3, is employed to prompt the user to provide user confirmation 608 prior to deleting the new files, as described in process block 610.

At decision block 612, in those cases where the user data activity includes the modification of existing files after the time of infection, $t_{infection}$, the device determines whether the modifications were, at least in part, attributable to the malware attack, or only to the user. At process block 614, the device may automatically restore the state of the malware-affected files prior to the infection. For example, the user data rollback process 132, first described with reference to FIG. 1, may be employed to automatically restore the state of the malware-affected user files to $t_{restore}$. In a typical embodiment, $t_{restore}$ may be the most recent time prior to the likely time of infection, $t_{infection}$, for which a saved disk state of the affected user files and other data are available.

At decision block 616, in those cases where the device determines that the modifications were only attributable to the user, then the user is given the option to restore the files. For example, at decision block 616, the user data rollback process 132 may employ the user interface process 310 to prompt the user to provide user confirmation 618 prior to restoring those user files, as described in process block 620.

Once the affected system and user files have been automatically or selectively restored, and the device has recovered from the malware attack, the process ends at termination block 622. In this manner, the device may be able to recover from a malware attack more quickly, and without unnecessary disruption of the user's activity than is typically possible using conventional malware disinfection.

Figure 7:
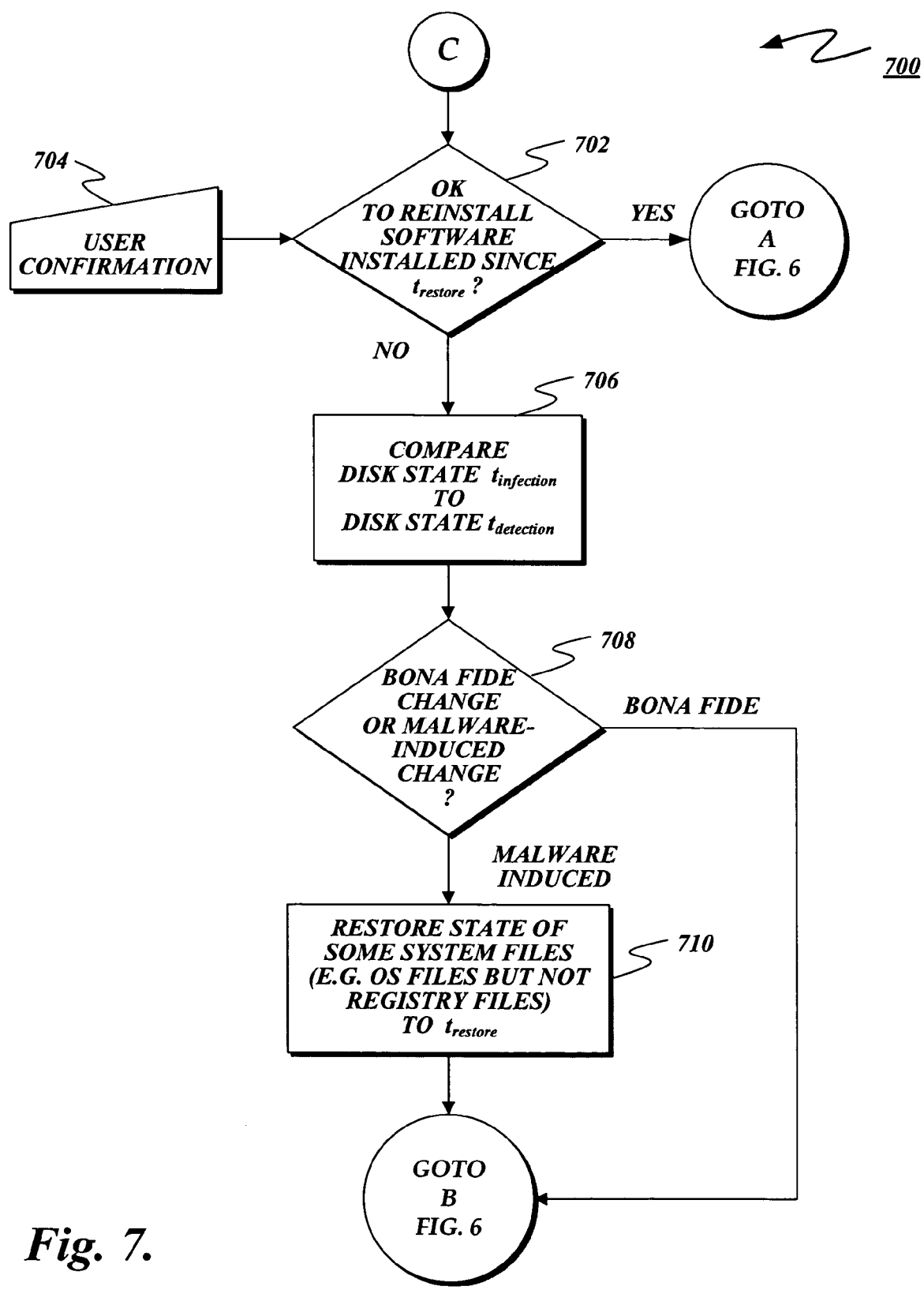
FIG. 7 is a flow diagram illustrating certain other aspects of the logic performed by a general-purpose computer system for recovering from a malware attack, formed in accordance with the present invention.

FIG. 7 is a flow diagram illustrating certain aspects of the logic 700 performed by a method for recovering from a malware attack formed in accordance with the present invention. In those cases where there has been both user data activity and software installation activity, the device may selectively restore the state of some system files depending on whether the activity was malware induced or bona fide. Prior to doing so, at decision block 702, the user interface process 310 may be employed to receive a user confirmation 704 of whether the software that was installed can be reinstalled. In the case where the user confirms that reinstallation of the software is possible, e.g., the necessary installation disk is available, processing may branch to FIG. 6 at entry point "A," and the system restoration and selective recovery of the device may proceed as described with reference to FIG. 6.

Continuing with reference to FIG. 7, in those cases where the user does not want to have to reinstall the software, processing continues to determine whether the state of some system files may be recovered in a way that will reduce the impact on software installation activity that occurred after the time of the last available point of restoration, $t_{restore}$. For example, at process block 706, the system restore process 130 may be employed to compare the disk state saved at the time of infection, $t_{infection}$, with the disk state saved at the time that the malware attack was first detected, $t_{detection}$. Based on that comparison, at decision block 708, the system restore process 130 may determine whether the changes uncovered in the comparison were likely the result of bona fide changes to files, or were likely malware induced. At process block 710, in those cases where the changes were likely malware induced, the system restore process 130 may automatically restore only certain files and data, such as certain system files, but no registry entries. In those cases where the changes were likely bona fide changes, then the system restore process 130 may leave the files as they are.

In a typical embodiment, once the malware induced changes have been removed by restoring the affected files to the state they were in at the time of the most recent available restoration point, $t_{restore}$, then processing may branch to FIG. 6 at entry point "B." With reference to FIG. 6, processing continues at entry point "B," where the user data restoration and selective recovery of the device may proceed at decision block 604 in the same manner as previously described.

Figure 8A:
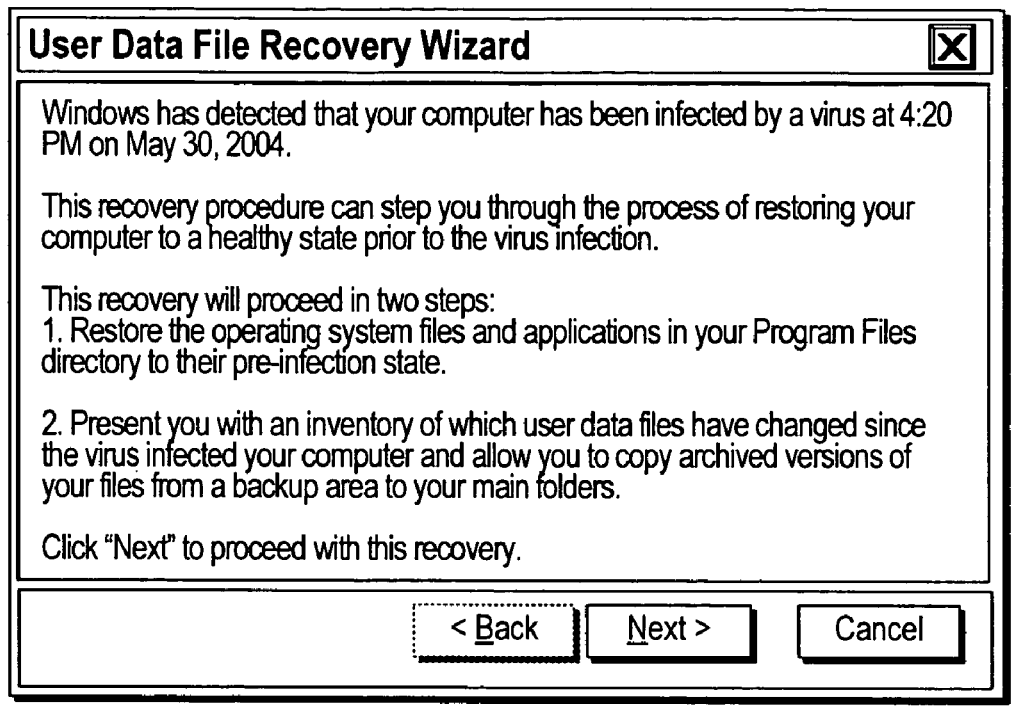
FIGS. 8A-8C are depictions of an exemplary user interface for implementing certain aspects of the method and system illustrated in FIGS. 1-7.
Figure 8B:
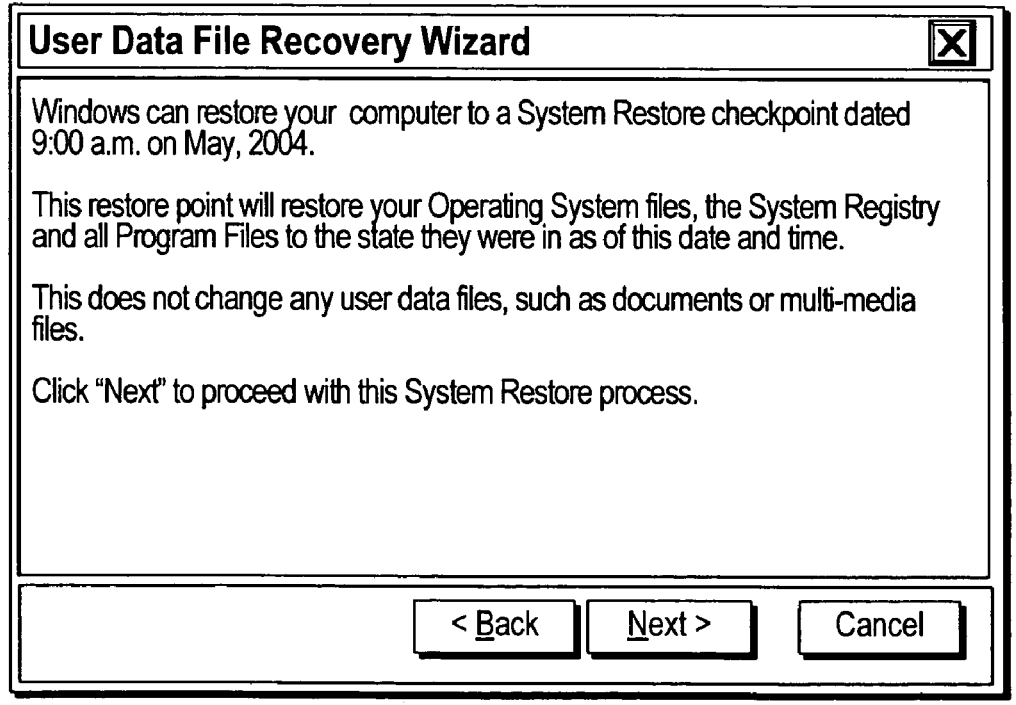
Figure 8C:
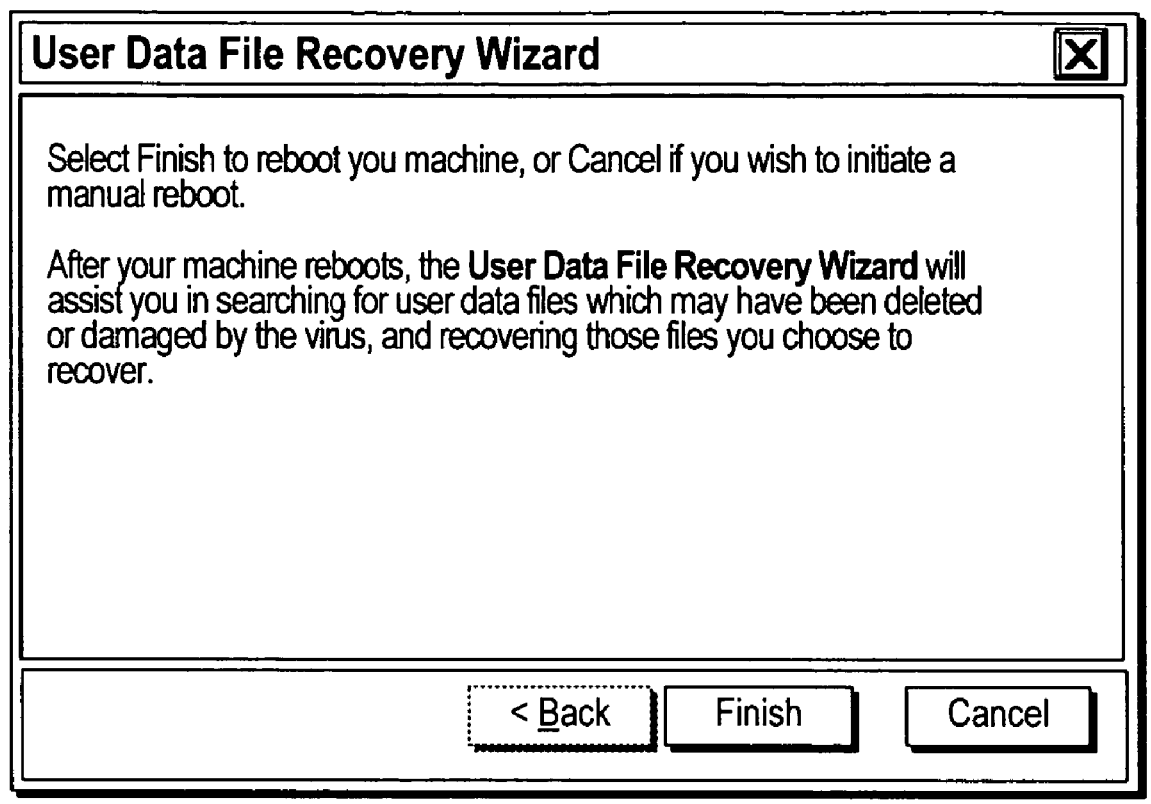

FIGS. 8A-8C are depictions of an exemplary user interface for implementing certain aspects of the method and system illustrated in FIGS. 1-7. FIG. 8A illustrates an example of a system restore portion of a rollback and recovery user interface 310, as first described in FIG. 3. In the illustrated example, the user interface is entitled "System Rollback and Recovery Wizard." This window introduces the user to a wizard-style of user interface that will guide the user through the process of restoring certain system files and other system data that may have been damaged during the malware attack on their computer. In a typical embodiment, the wizard will guide the user through the process of restoring the files to at least the state that they were in prior to the likely time of infection.

In the illustrated example, the user is informed that the recovery of their computer will proceed in two steps. First, the user is informed that the recovery process will restore the operating system files and applications to their pre-infection states, as previously described with reference to the system restore process 130. Then, the user is informed that the recovery process will present the user with an inventory of user data files that have changed since the attack, as previously described with reference to the user data rollback process 132. The user is further informed that the recovery process will provide the user with the opportunity to copy the archived versions from a backup, e.g., from a saved disk state, to the main folders, e.g., to live data, as will be further described with reference to FIGS. 9A-9E. By interacting with the command buttons, e.g., the "NEXT" command button, the user can step through the wizard to authorize and confirm the recovery of all or selected files and other data on their computer.

FIGS. 8B and 8C are depictions of further aspects of the wizard, including informing the user of the most recent available time to which the operating system on their computer may be restored. In a typical embodiment, completion of the system rollback recovery wizard and corresponding system restore process 130 will automatically trigger the operation of the user data rollback process 132 and user data file recovery wizard as illustrated in FIGS. 9A-9E.

Figure 9A:
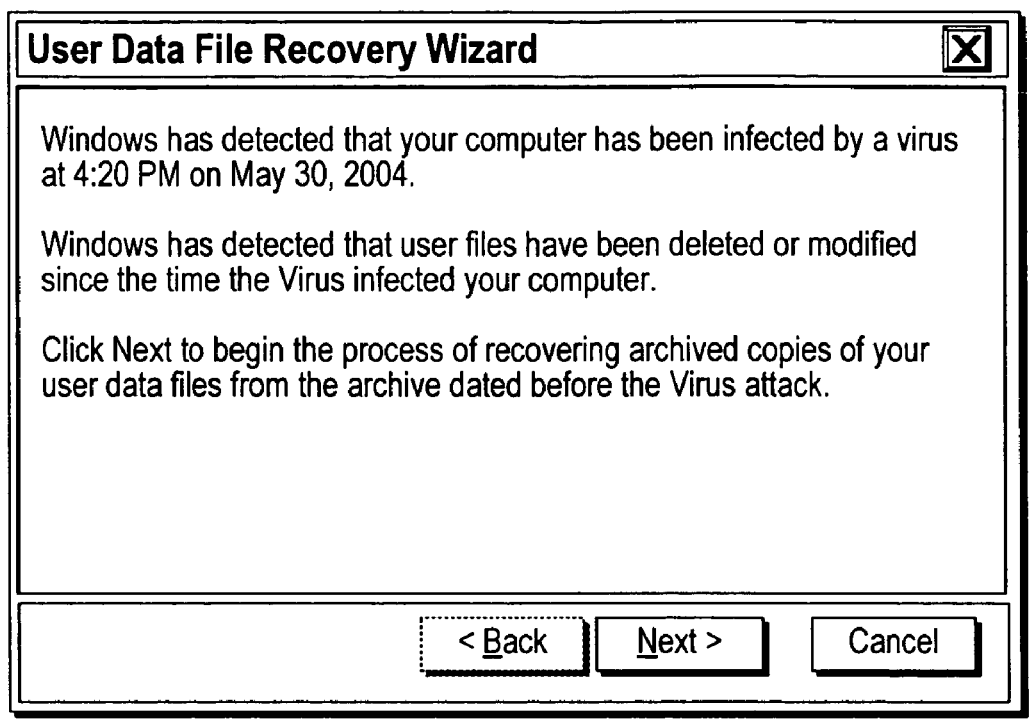
FIGS. 9A-9E are depictions of an exemplary user interface for implementing certain other aspects of the method and system illustrated in FIGS. 1-7.

FIGS. 9A-9E are depictions of an exemplary user interface for implementing certain aspects of the method and system illustrated in FIGS. 1-6. FIG. 9A illustrates an example of a user data rollback portion of a rollback and recovery user interface 310, as was first described in FIG. 3. In the illustrated example, the interface is entitled "User Data File Recovery Wizard," and introduces the user to a wizard-style of user interface that will guide the user through the process of restoring all or selected user files or other data that may have been damaged during the malware attack on their computer. In a typical embodiment, the wizard will guide the user through the process of restoring the files to at least the state that they were in prior to the likely time of infection.

Figure 9B:
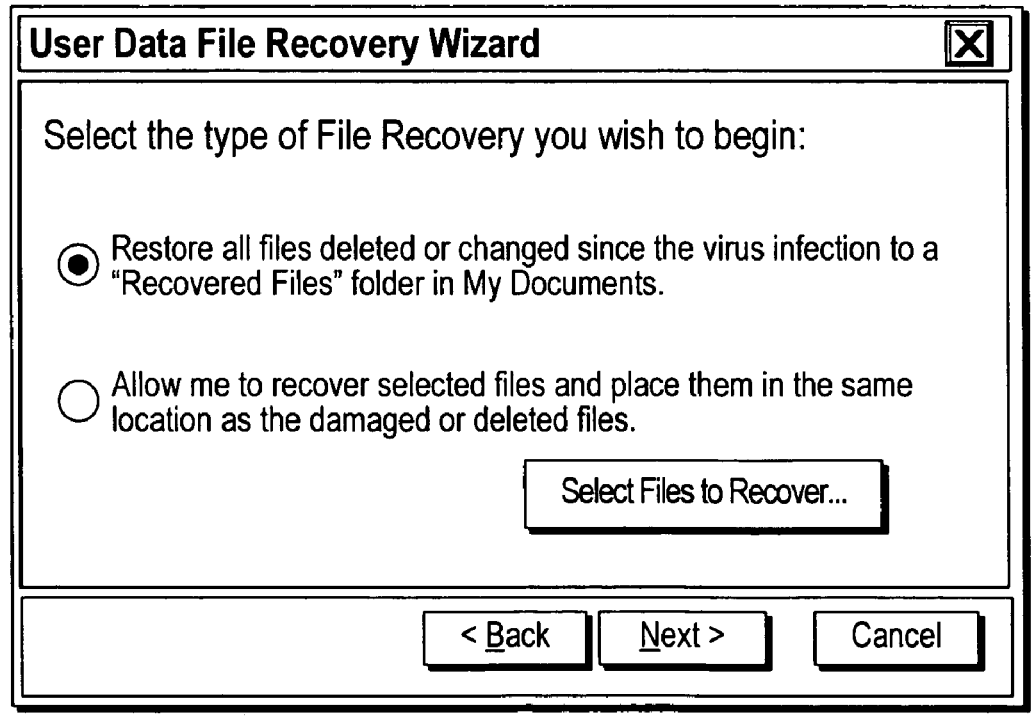
Figure 9C:
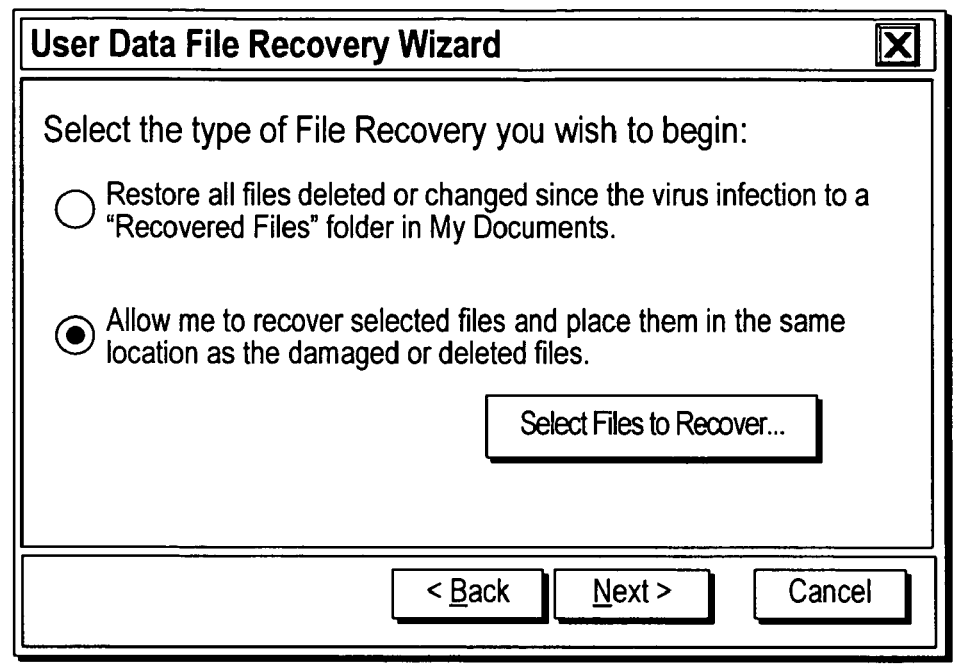

In the portion of the example interface illustrated in FIGS. 9B and 9C, the user is provided with option buttons that may be used to select the option of recovering all of the files that were deleted or changed since the likely time of infection, $t_{infection}$, or, alternatively, the option of recovering selected ones of the files that were deleted or changed. By interacting with the option and command buttons, e.g., the "NEXT" command button, the user can step through the wizard to recover all or selected files and other data on their computer.

Figure 9D:
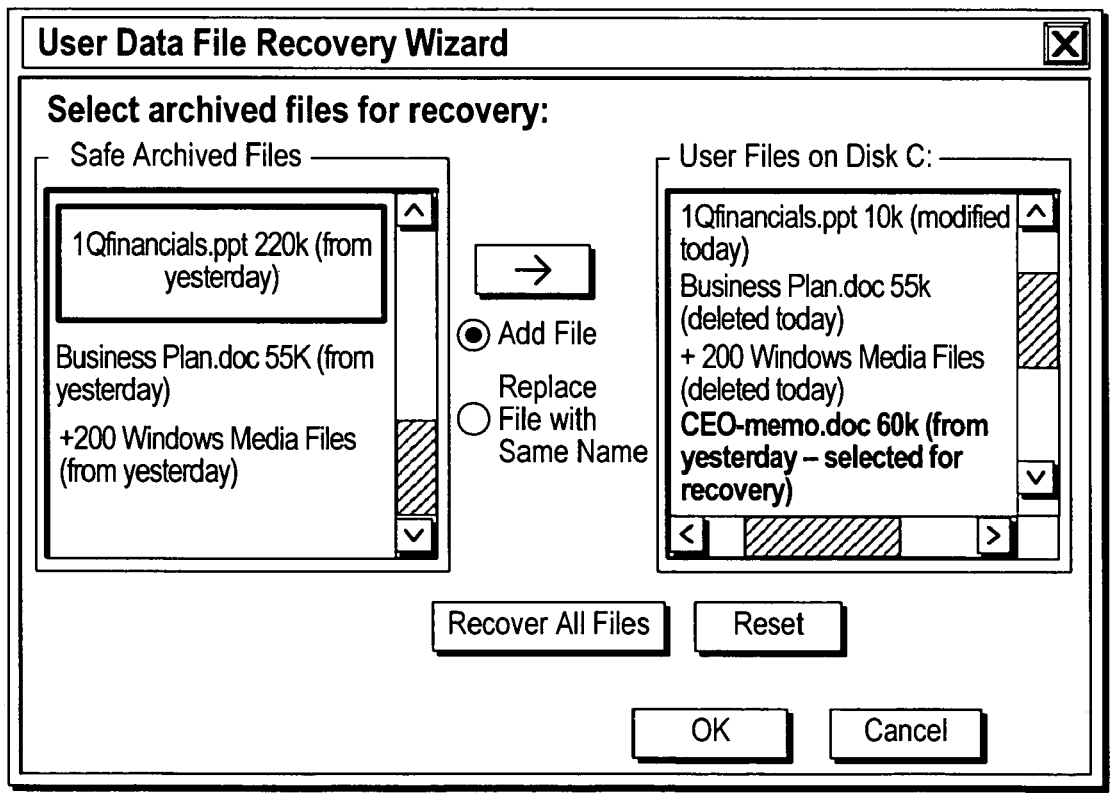
Figure 9E:
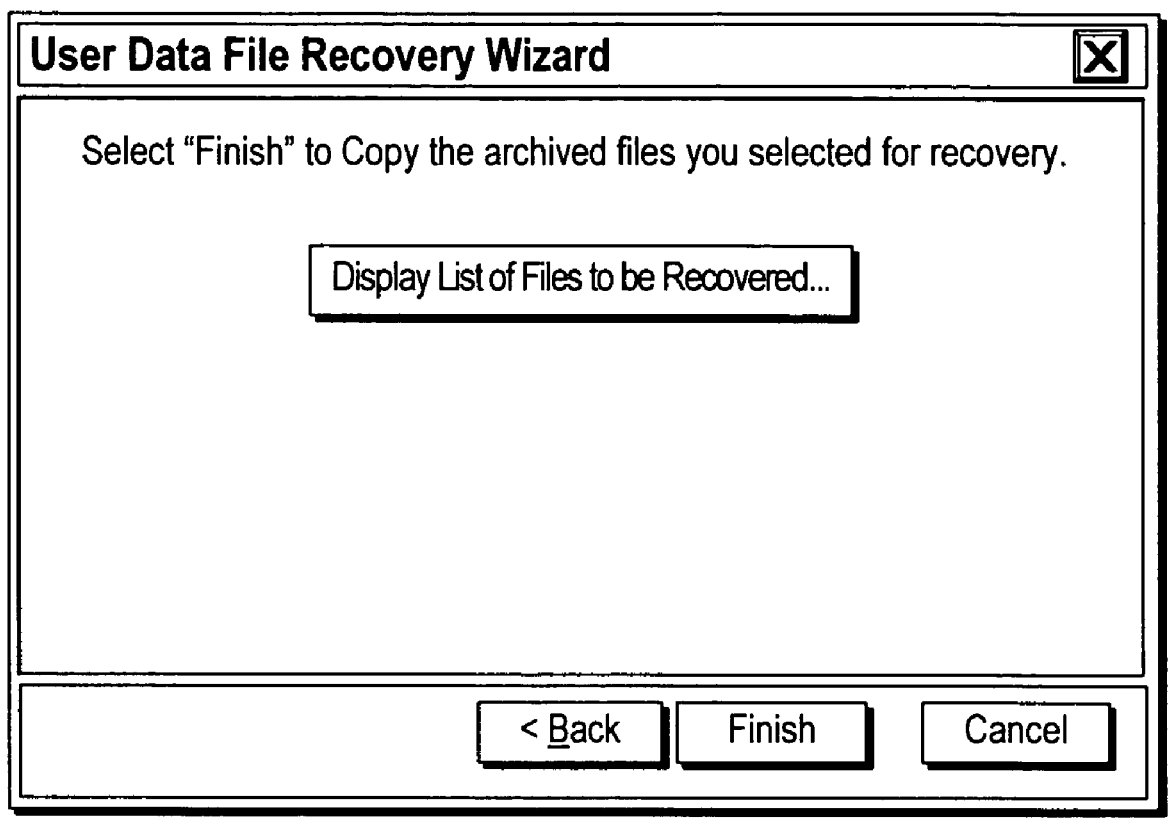

FIG. 9D is a depiction of further aspects of the wizard, including displaying a first window listing those archived files that are available to recover files that were deleted or changed since the likely time of infection, $t_{infection}$. Further provided is a selection interface to select files for recovery by copying them from the first window to a second window proximate to the first window. In a typical embodiment, completion of the user data rollback process 132 and user data file recovery wizard is completed only after the user has a chance to display and affirmatively confirm the files that they selected for recovery, as illustrated in FIG. 9E.

While numerous embodiments of the invention have been illustrated and described, it will be appreciated that various changes can be made therein without departing from the spirit and scope of the invention. For example, in one embodiment of the present invention, the functionality of the various components of the system 100 for recovering from a malware attack may be implemented in different combinations of processes, programs, interfaces, and repositories, and may be distributed across one or more computing devices. For example, some of the functionality of the system 100, such as the infection detector process 104, may be implemented remotely in a web service to which the client computing device 300 is subscribed, while other functions, such as the state change parser/aggregator 116, may be implemented locally. It will be further appreciated that although the embodiments of the invention have been described in the context of recovering from an infection caused by a malware attack, the methods and systems may also be applied to reverse the effects of contamination caused by the presence of unwanted software, such as performance degradation due to spyware or adware.

The embodiments of the invention in which an exclusive property or privilege is claimed are defined as follows:

1. A method for restoring a self-healing device, the method comprising:
    archiving data associated with the self-healing device into at least one recovery volume, wherein each of the at least one recovery volume contains the data associated with the self-healing device at a particular point in time;
    uncovering evidence indicating a presence of an infection in the self-healing device;
    determining a time the infection occurred;
    determining which one of the at least one recovery volume was created prior and closest in time to the time the infection occurred;

determining a graded level of trustworthiness for the volume determined to be created prior to and closest in time to the time the infection occurred, wherein the determined graded level of trustworthiness is associated with one of a plurality of colors, wherein each color corresponds to a predetermined level of trustworthiness which indicates a degree of confidence that the restoration data is not infected;

receiving an indication from a user indicating that, using the assigned color as guide, the user has decided to proceed with restoring at least a portion of data associated with the self-healing device; and based on the received indication, restoring the data portion associated with the self-healing device that has changed with respect to data associated with the one of the at least one recovery volume.

2. The method of claim 1, wherein uncovering evidence indicating the presence of the infection includes uncovering evidence indicating the presence of a known virus or the occurrence of unusual disk or network activity.

3. The method of claim 1, further comprising:
detecting changes in the state of the self-healing device proximate to a first point in time, wherein uncovering evidence indicating the presence of the infection is based in part on the changes that were detected.

4. The method of claim 3, wherein detecting changes in the state of the self-healing device proximate to the first point in time includes parsing information from a change journal maintained for a file system used by the self-healing device.

5. The method of claim 4, wherein the change journal is a Windows NT File System change journal.

6. The method of claim 3, wherein detecting changes in the state of the self-healing device proximate to the first point in time includes determining differences between remotely located data within one of the at least one recovery volume and live data on the self-healing device.

7. The method of claim 3, wherein detecting changes in the state of the self-healing device proximate to the first point in time includes examining the at least one recovery volume saved locally on the self-healing device.

8. The method of claim 1, wherein the at least one recovery volume is a volume shadow copy generated by Windows Volume Snapshot Services.

9. A method of recovering from a malware attack, the method comprising:
creating a plurality of saved disk states(s) of a self-healing device at fixed points in time;
obtaining information from at least one of a change journal and from one of the saved disk state(s);
analyzing the information to uncover evidence indicating that an infection has occurred;
localizing the infection to one of the fixed points in time based on the information;
identifying changes occurring since the time of the infection and rolling back the changes to reflect the same data contained the one of the saved disk state(s);
determining a graded level of trustworthiness for the saved disk state(s) determined to be created prior to and closest in time to the time the infection occurred, wherein the determined graded level of trustworthiness is associated with one of a plurality of colors, wherein each color corresponds to a predetermined level of trustworthiness which indicates a degree of confidence that the restoration data is not infected;
presenting the identified changes to a user and receiving authorization from the user before rolling back the identified changes; and receiving an indication from the user indicating that, using the assigned color as guide, the user has decided to proceed with restoring at least a portion of data associated with the self-healing device.

10. The method of claim 9, wherein the information is parsed from the at least one of the change journal and the one of the saved disk state(s).

11. The method of claim 9, wherein the information is a state change associated with the self-healing device.

12. The method of claim 9, wherein the change journal is a Windows NT File System change journal.

13. The method of claim 9, wherein the one of the saved disk state(s) is a volume shadow copy generated by Windows Volume Snapshot Services.

14. A system for a self-healing device, the system comprising:
a storage device that stores a plurality of recovery volumes at a plurality of fixed points in time of the data associated with the self-healing device;
a repository of malware information;
a repository of system audit information;
a repository of listed activities that constitute unusual or suspicious disk or network activity; a processor to:
uncover evidence of infection from a mal ware attack or the presence of unusual or suspicious disk or network activity, or a combination thereof,
determine a time in which the infection from a mal ware attack or the presence of unusual or suspicious disk or network activity occurred,
determine which one of the a plurality of recovery volumes was created closest and prior to the time in which the infection from a mal ware attack or the presence of unusual or suspicious disk or network activity occurred;
determine a graded level of trustworthiness for the recovery volume determined to be created prior to and closest in time to the time the infection occurred, wherein the determined graded level of trustworthiness is associated with one of a plurality of colors, wherein each color corresponds to a predetermined level of trustworthiness which indicates a degree of confidence that the restoration data is not infected;
receive an indication from a user indicating that, using the assigned color as guide, the user has decided to proceed with restoring at least a portion of data associated with the self-healing device;
restore all changed data between current data associated with the self-healing device and the one of the plurality of recovery volumes; and
analyze a user input authorizing recovery from the mal ware attack or the presence of unusual or suspicious disk or network activity, wherein the processor displays the changed data and recovers the changed data after receiving the user input authorizing recovery.

15. The system of claim 14, wherein the repository of system audits information includes at least one of a change journal.

16. A method for restoring a self-healing device, the method comprising:
archiving data associated with the self-healing device into at least one recovery volume, wherein each of the at least one recovery volume contains the data associated with the self-healing device at a particular point in time;
uncovering evidence indicating a presence of an infection in the self-healing device: determining a time the infection occurred;

determining which one of the at least one recovery volume was created prior and closest in time to the time the infection occurred;

determining a graded level of trustworthiness for the volume determined to be created prior to and closest in time to the time the infection occurred, wherein the determined graded level of trustworthiness is associated with one of a plurality of colors, wherein each color corresponds to a predetermined level of trustworthiness which indicates a degree of confidence that the restoration data is not infected, and wherein the determined graded level of trustworthiness is based on the data's intended use;

determining that the graded level of trustworthiness is sufficiently high for the data's intended use;

receiving an indication from a user indicating that, using the assigned color as guide, and further based on the determination that the level of trustworthiness is sufficiently high for the data's intended use, the user has decided to proceed with restoring at least a portion of data associated with the self-healing device;

based on the received indication, restoring the data portion associated with the self-healing device that has changed with respect to data associated with the one of the at least one recovery volume; and presenting the identified changes to a user and receiving authorization from the user before rolling back the identified changes.

* * * * *